US012092267B2

(12) United States Patent
Rebernik

(10) Patent No.: US 12,092,267 B2
(45) Date of Patent: Sep. 17, 2024

(54) CRYOGENIC VESSEL AND SECONDARY SYSTEM FOR FILLING AND VENTING THE CRYOGENIC VESSEL

(71) Applicant: Cryoshelter GmbH, Dobl-Zwaring (AT)

(72) Inventor: Matthias Rebernik, Dobl-Zwaring (AT)

(73) Assignee: Cryoshelter GmbH, Dobl-Zwaring (AT)

(*) Notice: Subject to any disclaimer, the term of this patent is extended or adjusted under 35 U.S.C. 154(b) by 308 days.

(21) Appl. No.: 17/635,100

(22) PCT Filed: Aug. 12, 2020

(86) PCT No.: PCT/AT2020/060303
§ 371 (c)(1),
(2) Date: Feb. 14, 2022

(87) PCT Pub. No.: WO2021/026582
PCT Pub. Date: Feb. 18, 2021

(65) Prior Publication Data

US 2022/0290810 A1 Sep. 15, 2022

(30) Foreign Application Priority Data

Aug. 14, 2019 (AT) .................................. 50153/2019

(51) Int. Cl.
*F17C 5/02* (2006.01)
*F17C 13/04* (2006.01)

(52) U.S. Cl.
CPC ................ *F17C 5/02* (2013.01); *F17C 13/04* (2013.01); *F17C 2201/056* (2013.01);
(Continued)

(58) Field of Classification Search
CPC ...... F17C 5/02; F17C 13/04; F17C 2201/056; F17C 2205/0107; F17C 2205/0142;
(Continued)

(56) References Cited

U.S. PATENT DOCUMENTS

2006/0231144 A1* 10/2006 Schwan ................ F17C 13/025 137/572
2008/0134693 A1* 6/2008 Harper ...................... F17C 1/12 62/50.7
2020/0018443 A1* 1/2020 Bouron ................... F17C 13/04

FOREIGN PATENT DOCUMENTS

DE 102006017541 A1 10/2006
DE 102016214577 A1 2/2018
WO 2018178173 A1 10/2018

OTHER PUBLICATIONS

International Search Report, mailed Nov. 12, 2020, for PCT/AT2020/060303 filed Aug. 12, 2020.

* cited by examiner

*Primary Examiner* — Eric S Ruppert
*Assistant Examiner* — Hans R Weiland
(74) *Attorney, Agent, or Firm* — Workman Nydegger

(57) ABSTRACT

A motor vehicle includes a vehicle frame and a system that includes a first cryogenic container and an ancillary system including a first connecting line routed into the first cryogenic container. A shut-off valve is provided in the first connecting line and a check valve opening in the filling direction is connected in parallel to the shut-off valve by means of a branch line so that the first cryogenic container can be filled via a filling coupling when the shut-off valve is closed and can be vented via the filling coupling or via a vent coupling separate therefrom and connected to the first connecting line when the shut-off valve is open. The system includes a second cryogenic container with a second con-
(Continued)

nection line and the ancillary system includes a single linkage line that connects the first and the second connecting lines.

7 Claims, 3 Drawing Sheets

(52) U.S. Cl.
CPC ................. *F17C 2203/0391* (2013.01); *F17C 2203/0629* (2013.01); *F17C 2205/0107* (2013.01); *F17C 2205/0142* (2013.01); *F17C 2205/0332* (2013.01); *F17C 2205/0335* (2013.01); *F17C 2205/0367* (2013.01); *F17C 2205/0388* (2013.01); *F17C 2221/033* (2013.01); *F17C 2223/0161* (2013.01); *F17C 2223/033* (2013.01); *F17C 2270/0168* (2013.01)

(58) Field of Classification Search
CPC ...... F17C 2205/0332; F17C 2205/0335; F17C 2205/0367; F17C 2205/0388; F17C 2221/033; F17C 2223/0161; F17C 2223/033; F17C 2270/016
See application file for complete search history.

CRYOGENIC VESSEL AND SECONDARY SYSTEM FOR FILLING AND VENTING THE CRYOGENIC VESSEL

The invention relates to a system comprising a cryogenic container and an ancillary system for filling and venting the cryogenic container, wherein the ancillary system comprises a connecting line routed into the first cryogenic container and a filling coupling is connected to the connecting line.

It is known from the prior art to install cryogenic containers on a motor vehicle, in which liquefied gas (e.g., LNG, "Liquid Natural Gas") is stored, which is used, for example, as a fuel for the motor vehicle. A connecting line is routed into each of the cryogenic containers, via which the cryogenic container can be filled.

According to the prior art, each of the cryogenic containers furthermore comprises a so-called vent coupling, which serves for discharging gas from the respective cryogenic container in order to reduce the pressure in the cryogenic container, i.e., the cryogenic container is "vented". For this purpose, one vent line each is routed into the respective cryogenic container, in addition to the filling line. The filling system and the venting system jointly form the so-called ancillary system of the cryogenic container.

According to this prior art, there are thus two independent systems for filling and venting, respectively. The prior art has the drawback that the laying of the lines of the ancillary system on the motor vehicle is complicated. In particular, the space for lines to be laid on the motor vehicle is extremely tight, and any space gain that is achieved can be used for enlarging the cryogenic container in order to store more cryofluid.

It is therefore the object of the invention to create an ancillary system for filling and venting a cryogenic container, which is particularly space-saving, but still allows the cryogenic container to be filled and vented, respectively.

This object is achieved according to the invention by a system comprising a cryogenic container and an ancillary system for filling and venting the cryogenic container, wherein the ancillary system comprises a connecting line routed into the first cryogenic container and a filling coupling is connected to the connecting line, with a shut-off valve being provided in the connecting line and a check valve opening in the filling direction being connected in parallel to the shut-off valve by means of a branch line, so that the cryogenic container can be filled via the filling coupling when the shut-off valve is closed and can be vented via the filling coupling or via a vent coupling separate therefrom and connected to the connecting line when the shut-off valve is open.

The solution according to the invention provides a possibility by means of which only a single connecting line has to be routed into the cryogenic container, i.e., the vent line and the filling lines no longer have to be connected separately to the cryogenic container. In this way, the number of pipe penetrations on the cryogenic container for the ancillary system for filling and venting can be reduced from two to one. By actuating the shut-off valve, it becomes possible to switch from a filling mode to the venting mode, which is achieved by the check valve connected in parallel.

The solution according to the invention contributes to reducing heat losses from the cryogenic containers, since cryogenic containers are double-walled, vacuum-insulated containers and all pipelines that are associated with the actual storage volume must penetrate the insulation vacuum and constitute a thermally conductive and mechanical connection between an inner tank and an outer container.

According to the invention, either the same coupling can be used for venting as for filling, i.e., the filling coupling is a combination coupling for filling and venting the cryogenic container, or a separate vent coupling can be provided for venting. The purpose of this is that the filling coupling and the vent coupling can be connected to pre-existing gas station connections, whereby backward compatibility is provided.

Furthermore, it is known from the prior art to install two cryogenic containers on a vehicle. The cryogenic containers are usually mounted on the left and right of the vehicle's supporting frame between axles of the vehicle. The two cryogenic containers usually have filling couplings that are accessible on the side of the motor vehicle so that the cryogenic containers can be filled up individually. Furthermore, it is known that the filling lines of the two cryogenic containers can be connected via a linkage line in order to fill up both cryogenic containers simultaneously via a filling coupling. Similarly, a separate venting system is provided for each cryogenic container, wherein the two vent lines can be connected by means of a separate linkage line so that both cryogenic containers can be vented via a single vent coupling.

According to this prior art, there are thus two independent systems for filling and venting, respectively, which each have a linkage line running through the supporting frame of the motor vehicle so that two cryogenic containers can simultaneously be filled and vented, respectively.

However, a drawback of this is that even more lines have to be laid in the area of the cryogenic containers. It is therefore a further object of the invention to create a system for filling and venting two cryogenic containers, which is particularly space-saving, but still allows both cryogenic containers to be filled and vented, respectively, from only one side.

According to the invention, this is achieved in that the above-mentioned system comprises an additional cryogenic container, with the ancillary system comprising an additional connecting line routed into the additional cryogenic container and a linkage line which connects the two connecting lines in such a way that the two cryogenic containers can be filled via the filling coupling and can be vented preferably via the filling coupling or the vent coupling.

The additional cryogenic container can basically be designed as known from the prior art, wherein at least joint filling is enabled via the linkage line. If the additional cryogenic container comprises a separate filling line and a separate vent line, the linkage line could, in one embodiment, open out into both the filling line and the vent line. In this case, the linkage line could comprise, for example, a check valve that can be opened in the direction of the additional cryogenic container and a shut-off valve connected in parallel thereto, as in the case of the first cryogenic container.

Solutions with a single linkage line for filling and venting both cryogenic containers thus enable that only a single linkage line has to be laid through or, respectively, across the supporting frame of the motor vehicle. It therefore becomes possible that as little installation space as possible is used in the area of the tanks, as a result of which the available space can be utilized for fuel volumes to the largest possible extent.

However, it is particularly preferred if both cryogenic containers are equipped with a combined filling and venting system, each having only one connecting line. For this purpose, an additional shut-off valve is provided in the additional connecting line, and an additional check valve opening in the filling direction is connected in parallel to the additional shut-off valve by means of an additional branch line.

In order to be able to fill up the two cryogenic containers from both sides of the motor vehicle, an additional filling coupling can be connected to the linkage line, with the filling couplings being accessible at different respective points, e.g., on opposite sides of the vehicle. In order to provide the same advantage for the ventilation, an additional filling coupling can preferably be connected to the linkage line, with the filling couplings being accessible on respective opposite sides of the motor vehicle. As a result, the cryogenic containers can be filled and vented, respectively, from both sides of the motor vehicle.

Furthermore, it is advantageous if a pressure relief valve is connected to the first connecting line and preferably a further pressure relief valve is also connected to the second connecting line. In contrast to the prior art, it may be envisaged that only one pressure relief valve is provided per cryogenic container.

In the assembled state, the invention provides a motor vehicle comprising a vehicle frame and the above-mentioned system, with the cryogenic container being installed on a first side of the supporting frame and the further cryogenic container being installed on a second side of the supporting frame opposite to the first one, wherein the ancillary system is placed on the motor vehicle in such a way that the filling coupling is accessible on the first side or on the second side. This motor vehicle is designed in such a way that, due to the slim design of the ancillary system, more installation space is available for additional components or larger cryogenic containers with more storage volume.

Particularly preferably, the motor vehicle is designed in such a way that one filling coupling and one vent coupling each or, respectively, a combined filling and vent coupling is/are accessible on the first side and the second side. As a result, the cryogenic containers of the motor vehicle can be filled and vented from both sides of the motor vehicle, while still achieving a large amount of extra space in comparison to the prior art.

Advantageous and non-limiting embodiments of the invention are explained in further detail below with reference to the drawings.

Figure 1:
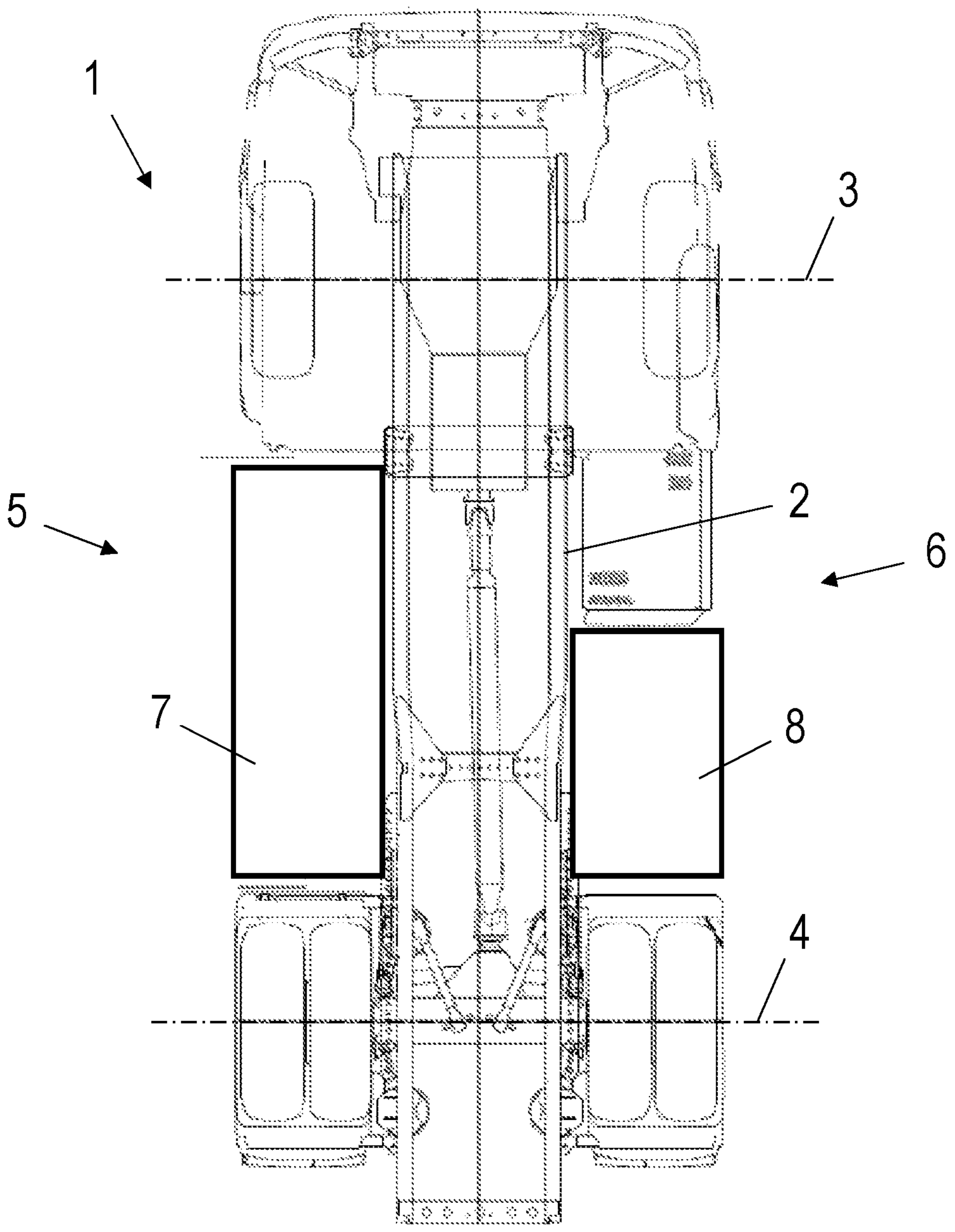
FIG. 1 shows a motor vehicle with two cryogenic containers installed.
Figure 2:
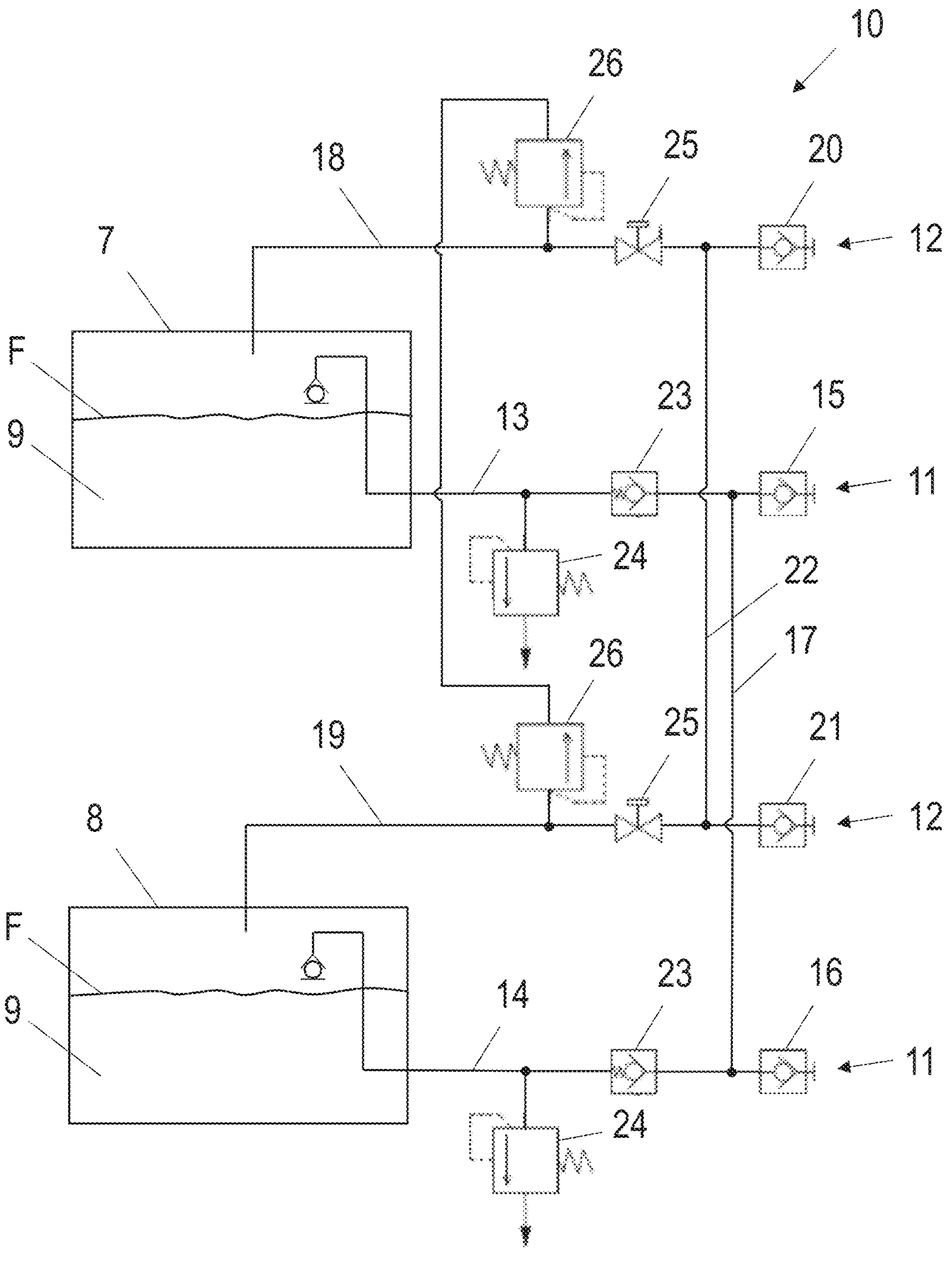
Fig. 2 (Prior art)
FIG. 2 shows two cryogenic containers and an ancillary system according to the prior art.
Figure 3:
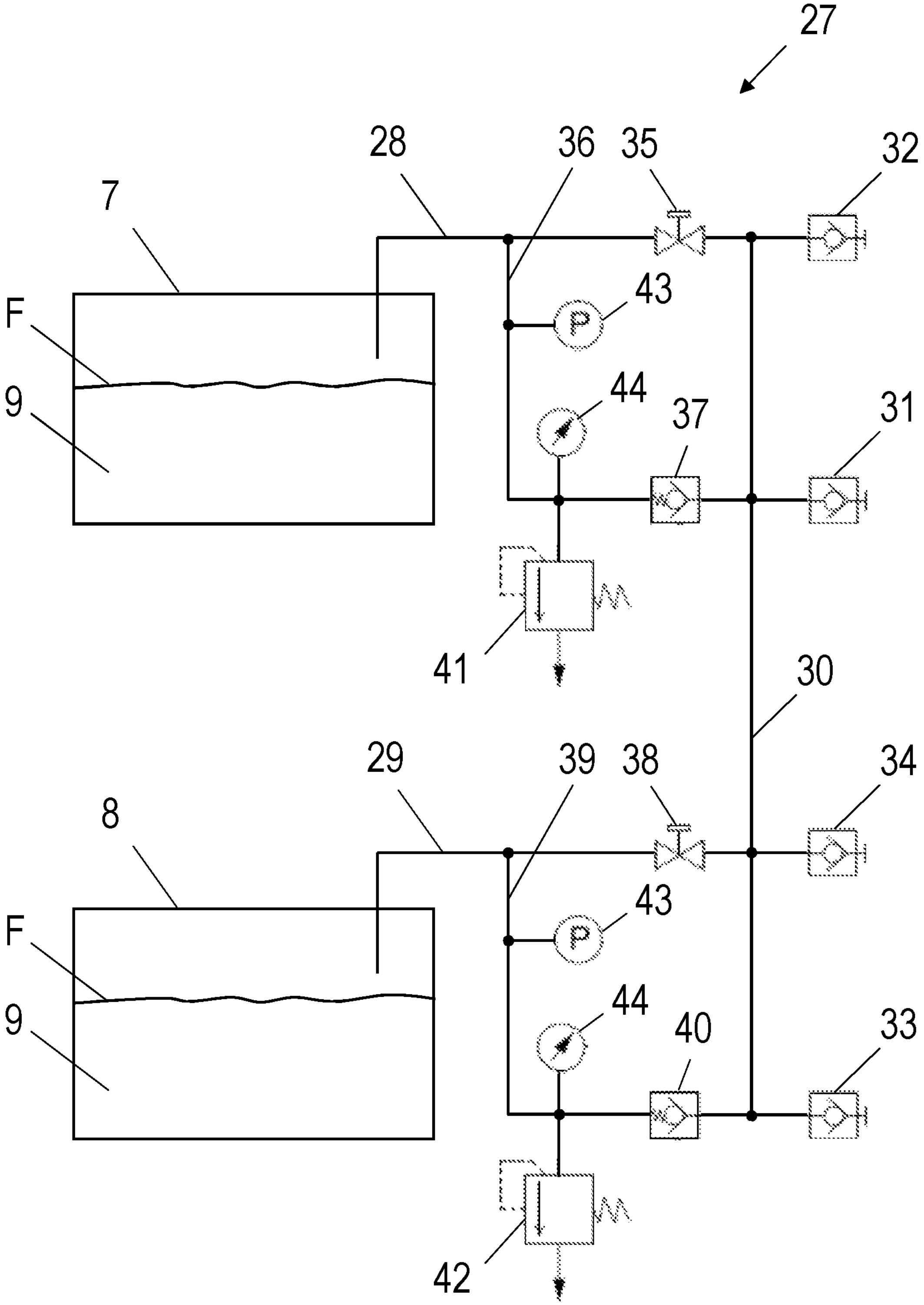
FIG. 3 shows a cryogenic container and a section of the ancillary system according to the invention.

FIG. 1 shows a motor vehicle 1 with a supporting frame 2 and two axles 3, 4. On both sides 5, 6 of the supporting frame 2, a cryogenic container 7, 8 is mounted between the axles 3, 4 in each case. The cryogenic containers 7, 8 each store fluid 9. e.g., liquefied natural gas, which is also known to those skilled in the art as LNG ("Liquid Natural Gas"). In the examples of FIGS. 2 and 3, the fluid 9 is in liquid form up to a fill level F, beyond that, it is in the gaseous state. If the cryogenic containers 7, 8 are used in connection with a motor vehicle, the stored fluid 9 can serve as a fuel for an engine of the motor vehicle 1, for example. In other embodiments, however, the cryogenic containers could also be provided in other areas of application.

The lines connected to the cryogenic containers 7, 8 are referred to in technical terms as an ancillary system. An ancillary system for filling and venting the first cryogenic container 7 and the second cryogenic container 8 is discussed in detail below.

FIG. 2 shows an ancillary system 10 for filling and venting two cryogenic containers 7, 8 as known from the prior art. The ancillary system 10 is divided into a filling system 11 and a venting system 12 that is independent thereof.

The filling system 11 comprises a first filling line 13 which is routed into the first cryogenic container 7 and a second filling line 14 which is routed into the second cryogenic container 8. The first filling line 13 has a first filling coupling 15 which is accessible on the first side 5 of the motor vehicle 1, and the second filling line 14 has a second filling coupling 16 which is accessible on the second side 6 of the motor vehicle 1. The filling lines 13, 14 are connected by means of a first linkage line 17 so that the two cryogenic containers 7, 8 can be filled simultaneously by only one of the two filling couplings 15, 16.

The venting system 12 comprises a first vent line 18 which is routed into the first cryogenic container 7 and a second vent line 19 which is routed into the second cryogenic container 8.

The first vent line 18 has a first vent coupling 20 which is accessible on the first side 5 of the motor vehicle 1, and the second vent line 19 has a second vent coupling 21 which is accessible on the second side 6 of the motor vehicle 1. The vent lines 18, 19 are connected by means of a second linkage line 22 so that the two cryogenic containers 7, 8 can be vented simultaneously by only one of the two vent couplings 20, 21.

Furthermore, it is known from the prior art according to FIG. 2 to provide a check valve 23 in the respective filling line 13, 14 between the connection to the cryogenic container 7, 8 and the filling coupling 15, 16 in order to prevent a fluid flow from the cryogenic container 7, 8. Furthermore, a pressure relief valve 24 is connected to the respective filling line 13, 14 between the connection to the cryogenic container 7, 8 and the check valve 23. Furthermore, in the respective vent line 18, 19, a shut-off valve 25 can be provided, which is accessible on the side 5, 6 of the respective vent coupling 19, 20. By operating one of the shut-off valves 25, the cryogenic containers 7, 8 can be vented via the vent coupling 20, 21. Furthermore, a pressure relief valve 26 is provided in the respective vent line 18, 19 between the connection to the cryogenic container 7, 8 and the shut-off valve 25, wherein the pressure relief valves 26 can be connected, as has been shown.

FIG. 3 shows an ancillary system 27 for filling and venting the cryogenic containers 7, 8 according to the invention. Accordingly, there are not any separate filling and venting systems each routed separately into the cryogenic container by means of a line, but only a first connecting line 28 is routed into the first cryogenic container 7 and a second connecting line 29 is routed into the second cryogenic container 8.

The connecting lines 28, 29 thus serve firstly for introducing fluid 9 into the respective cryogenic container 7, 8 and secondly for venting the respective cryogenic container 7, 8. Furthermore, according to the invention, there is only one linkage line 30 between the two connecting lines 28, 29.

At least one filling coupling 31 and one vent coupling 32 are connected to the linkage line 30. For example, the filling coupling 31 and the vent coupling 32 can both be accessible on a side 5, 6 of the motor vehicle 1 so that the two cryogenic containers 7, 8 can be filled or vented by means of the linkage line 30. More generally, the filling coupling 31 and the vent coupling 32 could also be accessible on opposite sides 5, 6.

A further filling coupling 33 and/or a further vent coupling 34 can be connected to the linkage line 30 in order to be able to fill and vent, respectively, the two cryogenic containers 7, 8 from both sides 5, 6. Alternatively or additionally, a combination coupling, which is not illustrated any further, can be provided for filling and venting. In this case, one filling coupling 31, 33 and one vent coupling 32, 34 (or, respectively, one combination coupling each) are preferably provided on each side 5, 6, so that the cryogenic containers 7, 8 can be filled or vented from both sides 5, 6 of the motor vehicle 1.

Thus, according to the invention, an ancillary system 27 is created in which both a filling coupling 31 and a vent coupling 32 (or, respectively, a combination coupling) are connected to the same linkage line 30. The first cryogenic container 7, the second cryogenic container 8, the filling coupling 31 and the vent coupling 32 are thus interconnected via a single pipe string. Preferably, as described, even two filling couplings 31, 33 and two vent couplings 32, 34 (or, respectively, two combination couplings) are connected to the same linkage line 30.

In the embodiment shown in FIG. 3, it is furthermore envisaged that a shut-off valve 35 is provided in the connecting line 28 and a check valve 37 opening in the filling direction is connected in parallel to the shut-off valve 35 by means of a branch line 36. The shut-off valve 35 is usually accessible next to the vent coupling 32 (or, respectively, the combination coupling). As a result, it may be envisaged that the single linkage line 30 can also be used in conjunction with the shut-off valve 35 and the check valve 37. A person skilled in the art will understand that an embodiment in which the shut-off valve 35 is provided in the branch line 36 and the check valve 37 is provided in the connecting line 28 is identical to the above-mentioned solution. In particular, this embodiment can also be used for just one cryogenic container 7, 8, as a result of which the linkage line 30 may be omitted as well.

The connecting line 28 is thus connected with one end to the cryogenic container 7 and opens out with another end into the filling coupling 31 and into the vent coupling 32 (or, respectively, into the combination coupling), the shut-off valve 35 being arranged with a check valve 37 connected in parallel in the connecting line between the cryogenic container 7 and the filling coupling 31 or, respectively, the vent coupling 32 (or, respectively, into the combination coupling).

The same can be provided for the second (additional) connecting line 29 so that an additional shut-off valve 38 is provided in the additional connecting line 29 of the second cryogenic container 8 and an additional check valve 40 opening in the filling direction is connected in parallel to the additional shut-off valve 38 by means of an additional branch line 39.

In general, the second cryogenic container 8 could also be equipped with a filling line and a ventilation line separate therefrom, as shown in FIG. 2, so that the linkage line 30 opens out, on the one hand, into the connecting line 28 of the first cryogenic container and, on the other hand, into both the filling line and the ventilation line of the second cryogenic container 8.

Furthermore, it may be envisaged in the solution according to the invention that a pressure relief valve 41 is connected to the first connecting line 28 and preferably also a further pressure relief valve 42 is, in addition, connected to the second connecting line 29. For example, the pressure relief valve 41 or 42 can also be provided in the branch line 36 or, respectively, the additional branch line 39 and can be indirectly connected to the respective connecting line 28, 29 via said branch line.

Moreover, additional components such as a pressure sensor 43 for a control unit and/or a visual pressure display 44 can be provided in the respective connecting line 28, 29 or, respectively, the branch line 36, 39.

Additional shut-off valves could also be provided in the first connecting line 28, the second connecting line 29 and/or in the linkage line 30 in order to selectively fill or, respectively, vent only one of the two cryogenic containers 7, 8 via one of the filling couplings 31, 33 or, respectively, vent couplings 32, 34.

The ancillary system 27 illustrated above is depicted for two cryogenic containers 7, 8, but could easily be upgraded for use with one, three or more cryogenic containers.

The invention claimed is:

1. A motor vehicle comprising:

a vehicle frame; and a system comprising a first cryogenic container and an ancillary system for filling and venting the first cryogenic container, wherein the ancillary system comprises a first connecting line routed into the first cryogenic container and a filling coupling is connected to the first connecting line, wherein a first shut-off valve is provided in the first connecting line and a first check valve opening in a filling direction is connected in parallel to the first shut-off valve by means of a first branch line so that the first cryogenic container can be filled via the filling coupling when the first shut-off valve is closed and can be vented via the filling coupling or via a vent coupling separate therefrom and connected to the first connecting line when the first shut-off valve is open, wherein the system comprises a second cryogenic container and the ancillary system comprises a second connecting line routed into the second cryogenic container, wherein a second shut-off valve is provided in the second connecting line, and a second check valve opening in the filling direction is connected in parallel to the second shut-off valve by means of a second branch line, wherein the ancillary system further comprises a single linkage line which connects the first and the second connecting lines in such a way that the first and the second cryogenic containers can be filled via the filling coupling as well as vented via the filling coupling or the vent coupling via the single linkage line.

2. The motor vehicle according to claim 1, wherein the first shut-off valve and the second shut-off valve are pneumatically connected to one another.

3. The motor vehicle according to claim 1, wherein an additional filling coupling is connected to the second connecting line in such a way that the filling couplings are accessible at different points.

4. The motor vehicle according to claim 1, wherein a pressure relief valve is connected to the first connecting line.

5. The motor vehicle according to claim 1, wherein the first cryogenic container is installed on a first side of a supporting frame and the second cryogenic container is installed on a second side of the supporting frame opposite to the first one, wherein the ancillary system is placed on the motor vehicle in such a way that the filling coupling is accessible on the first side or on the second side.

6. The motor vehicle according to claim 3, wherein the filling coupling is accessible on a first side of a supporting frame and the additional filling coupling is accessible on a second side of the supporting frame.

7. The motor vehicle according to claim 4, wherein a further pressure relief valve is connected to the second connecting line.

* * * * *